United States Patent Office 3,515,260
Patented June 2, 1970

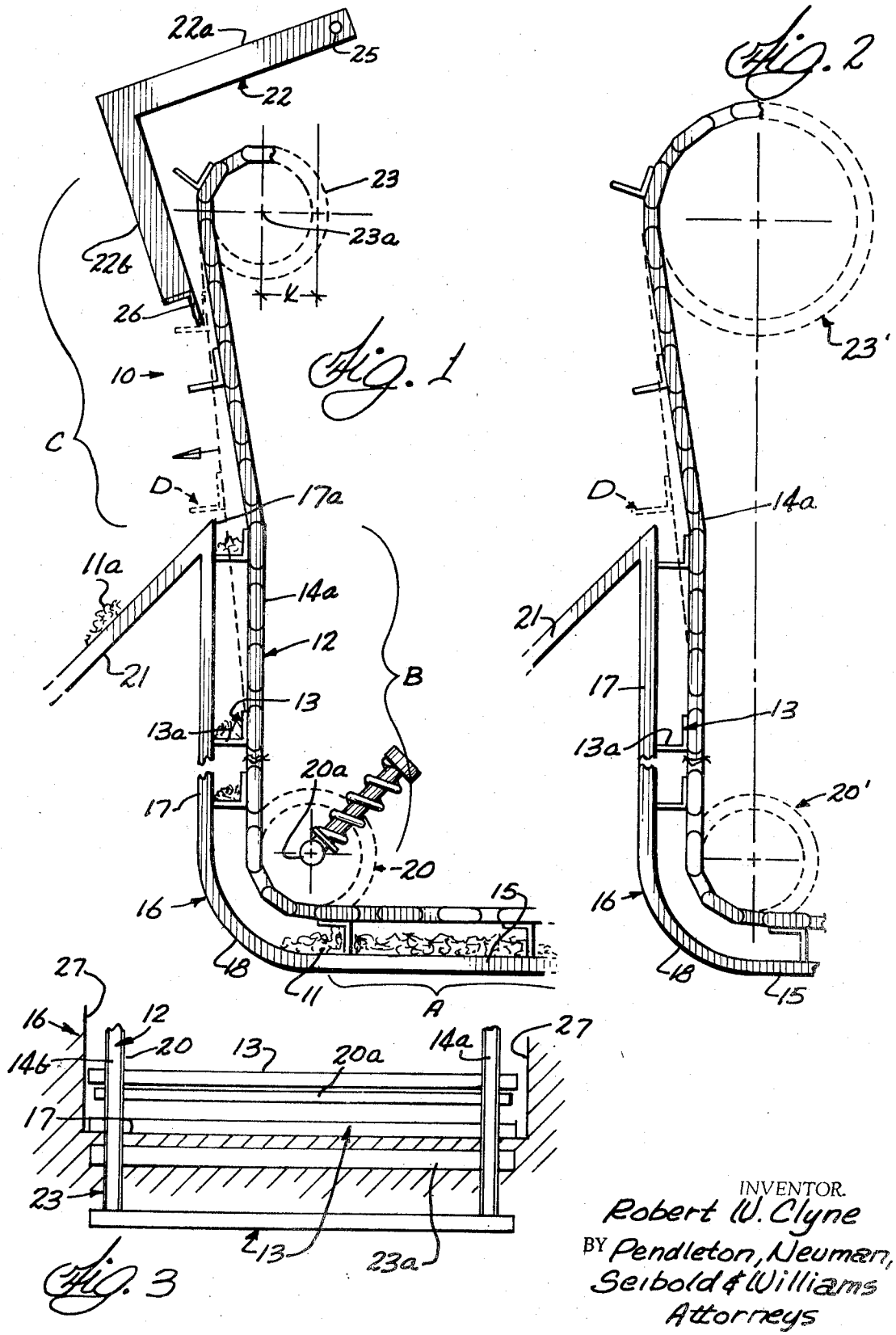

3,515,260
TANK DISCHARGING CONVEYOR
Robert W. Clyne, 5701 Sheridan Road,
Chicago, Ill. 60626
Filed May 10, 1968, Ser. No. 728,275
Int. Cl. B65g 19/06, 45/00
U.S. Cl. 198—154   3 Claims

ABSTRACT OF THE DISCLOSURE

An apparatus is provided for the mechanical handling of industrial waste or the like subsequent to the latter being deposited in a settling tank, sump, or reservoir. The apparatus comprises an endless chain having mounted thereon a plurality of spaced flights which during a first segment of travel contact the waste accumulated along the bottom of the tank, during a second segment of travel move vertically and carry therewith portions of the waste, and during a third segment of travel discharge the carried waste portions outside the tank. Upon moving from the second to the third segment of travel, each flight springs outwardly a predetermined distance causing the carried waste portion to be dislodged from the flight in question. The apparatus in question is an improvement of an apparatus of the type disclosed in my Pat. No. 3,303,920.

BACKGROUND OF THE INVENTION

Frequently, with certain types of industrial waste the character of the waste is such that it tenaciously adheres to the surface of the elevating flights and thus presents problems in removing same from the flight surface unless some type of stripper unit is utilized in combination with the flights. Even in instances where a stripper unit is utilized, it is sometimes ineffective because the compactness of the waste portion carried by the flights causes the stripper unit to ride over the waste portion rather than initially penetrate same as desired.

SUMMARY OF THE INVENTION

Thus, it is an object of this invention to provide an apparatus which is of simple and sturdy construction and yet is effective in handling waste which varies in character over a wide range.

It is a further object of this invention to provide an apparatus which enables the waste to be removed in a vertical direction rather than up an inclined ramp-like wall.

It is a further object of this invention to provide an apparatus which readily breaks at a predetermined discharge station any suction or adhesive bond that might have been created between the flight surface and waste and thus greatly facilitates the removal of the waste from the flights.

Further and additional objects will appear from the description, accompanying drawings, and appended claims.

In accordance with one embodiment of this invention an apparatus is provided for use in the handling of industrial waste which has accumulated in a settling tank or the like. The apparatus comprises an endless chain which is power driven for movement in one direction. Mounted on the chain and projecting outwardly therefrom are a plurality of flights arranged in spaced relation. A portion of the chain is disposed within the settling tank and during a first segment of travel the flights move along the bottom of the tank whereby the outwardly projecting flights contact the accumulated waste and cause a portion of said waste to be moved towards an upright wall of the tank. During a second segment of travel the flights engage and slide upwardly along a vertical wall surface elevating portions of the waste to the upper end limits of the wall surface, and during a third segment of travel the flights discharge the waste portions outside of the tank. As the waste-loaded flights pass from the second to the third segments of travel, the flights and associated chain sections spring abruptly outwardly a predetermined amount causing the waste portions to move relative to the projecting flights and thus become readily dislodged from the flights.

DESCRIPTION

For a more complete understanding of the invention, reference should be made to the drawing wherein:

FIG. 1 is a fragmentary vertical sectional view of the settling tank and the improved apparatus incorporated therein;

FIG. 2 is similar to FIG. 1 but showing a modified form of the improved apparatus; and FIG. 3 is a fragmentary top plan view of the structure shown in FIG. 1.

Referring now to FIG. 1 of the drawing, one form of an improved apparatus 10 is shown for use in mechanically handling large amounts of industrial waste 11 or the like. The instant invention is an improvement of the product handling apparatus disclosed in my afore-identified Pat. 3,303,920.

Apparatus 10 includes an endless flight conveyor 12 having a plurality of spaced elongated flights 13 affixed to predetermined links of a pair of spaced chain sections 14a and b. The flights in the illustrated embodiment are angle-shaped in cross-section and each has a leg or flange 13a which extends transversely outwardly from the link of the chain section. If desired, however, the shape of the flights may be of the type illustrated in my aforenoted U.S. Pat. 3,303,920.

The conveyor 12 during one segment A of travel moves in a horizontal direction along the bottom surface 15 of the tank or sump 16 in which the waste has accumulated. While moving through segment A, the legs 13a of the flights engage the surface of the bottom and cause portions of the waste to be moved towards a vertical end wall 14 of the tank 15. The bottom and end wall of the tank are joined to one another by a curved section 18, see FIGS. 1 and 2. Upon the flights 13 reaching the curved section 18 of the tank 16, each flight causes a portion 11a of the accumulated waste to be picked up from the bottom of the tank and moved vertically upwardly through a segment B of travel. In order to effect a smooth transition in the flight direction, a spring-loaded idling sprocket or roller 20 is provided. The axis of rotation 20a of the sprocket is substantially coincident to the center of curvature of the tank section 18.

While the flights 13 are moving through segment B, the distal ends of the legs 13a slidably engage the surface of tank wall 17. In instances, however, where the wall surface is rough and uneven, a veneer-type plate may be utilized which is adapted to be positioned adjacent the end wall surface.

At the upper edge 17a of the tank wall 17 there is provided a spillway 21 onto which the elevated portions of the waste are caused to be discharged, see FIG. 1.

Upon each flight moving past the upper edge of the tank wall 17, it will automatically and abruptly spring outwardly causing the elevated waste portion 11a to be either completely dislodged from the flight leg 13a or at least loosened therefrom so that it may subsequently be readily removed from the flight by a stripper assembly 22 which will be described more fully hereinafter.

The outward springing action of the flights 13 upon passing the upper edge 17a of tank wall 17 is accomplished in the apparatus 10, shown in FIG. 1 by the axis 23a of the drive sprocket 23 being offset outwardly by a predetermined amount X. The dimension X will depend upon the disposition of the drive sprocket above the tank wall upper edge 17a and the comparative diameters of the idling sprocket 20 and drive sprocket 23. In instances where the diameter of the drive sprocket 23', see FIG. 2, is substantially greater than the diameter of idling sprocket 20', the axes of the two sprockets may be vertically aligned rather than offset. In either case, once the flight leg 13a clears the tank wall upper edge 17a, it will move outwardly to the position D shown in dotted lines in FIGS. 1 and 2. Because of the character of the chain 12, the amount of offset is relatively small (e.g., 2½–3″) in most instances.

After passing the upper edge 17a, the flights move through a segment C. While in segment C the flight legs 13a are successively engaged by a portion of the stripper assembly 22 and the waste portion 11a is pushed endwise off the flight.

The assembly 22 in one form comprises an L-shaped arm 24 which has one end of an extension 24a thereof pivotally mounted at a point 25 disposed above and to the right of drive sprocket 23, see FIG. 1. The other arm extension 22b depends from the other end of extension 2a and has affixed to the lower end thereof a blade 26 which is adapted to engage the flight leg 13a and then slide outwardly therealong pushing ahead of it the waste portion 11a until it drops off the flight leg 13a onto spillway 21.

Certain types of waste are of a compact, dense character and tenaciously adhere to the surface of the flight, with the result that in prior apparatus the stripper blade could not penetrate the waste portion but instead would ride over same. The abrupt outward springing movement of the flights in the improved apparatus, however, causes the suction-like adherence of the waste portion to the flight to be broken whereby the stripper blade 26 can position itself behind the waste portion before moving same endwise off the flight leg.

Because of the configuration of the stripper assembly 22, the relative position of the pivot point 25 for said assembly, and the direction of movement of the flights through segment C, the blade 26 will move outwardly relative to the flight leg.

In FIG. 3 the lengths of the flights 13 with respect to the spacing between the vertical side walls 27 of the tank 16 are shown. It will be noted that the ends of each flight are disposed closely adjacent the tank side walls 27 thereby minimizing lateral spilling of the waste portions 11a from the flights as they move through segment B of travel.

In certain installations where the apparatus is to be utilized in an existing tank, and the bottom and end wall of which are not suitable for engagement by the ends of the flights and there is no curved portion at the junction of the bottom and end wall, an ejector frame, not shown, may be utilized. The frame in such a case would include a bottom-forming plate which would correspond closely to the size and shape of the existing tank's bottom, an upright end plate, closely dimensioned to the height and width of the tank's end wall, and a curved portion shaped as shown in FIG. 1. The frame is of unitary construction and would be submerged in the tank and rest upon the tank's bottom. Suitable brackets and the like would be provided for supporting the sprockets 20 and 23 and other operating mechanisms.

Thus, it will be seen that an improved product handling apparatus has been provided which readily facilitates the handling of a wide variety of waste products. The apparatus by reason of its outward springing action effectively breaks the tenacious adherence which sometimes exists between certain types of waste products and various components of the apparatus. The improved apparatus eliminates costly and complex components and the need for inclined ramp-like members which restrict the area of the tank bottom surface which can be engaged by the flights.

While several embodiments of the invention have heretofore been described, it is to be understood of course that the invention is not limited thereto, but further modifications are contemplated.

I claim:

1. An apparatus for use in removing from a tank waste which has accumulated along the bottom surface thereof, said apparatus comprising an endless conveyor having mounted thereon a plurality of longitudinally spaced flights, an idling sprocket positionable within the tank and adjacent the bottom surface thereof, and a drive sprocket disposed above said idling sprocket and outside of the tank, said idling and drive sprockets engaging said conveyor and said drive sprocket actuating said conveyor in one direction whereby said flights pass through a plurality of segments of travel; each flight, when passing through a first segment of travel, having an outwardly projecting portion thereof positionable adjacent the tank bottom surface and in contact with the waste accumulated thereon and moving a portion of the contacted waste towards a vertical wall surface at one end of the tank; when passing through a second segment of travel, each flight outwardly projecting portion continuously and slidably engaging the wall surface and moving upwardly with respect thereto carrying therewith the waste portion until said loaded flight passes the upper edge of the wall surface whereupon the loaded flight automatically and abruptly springs outwardly effecting dislodgement of the waste portion from the flight; the axes of rotation of said idling and drive sprockets being parallel and vertically spaced, and the point of initial engagement between the periphery of said drive sprocket and a flight subsequent to the latter passing the upper edge of the wall surface being offset laterally relative to the point of disengagement between a flight and the periphery of said idling sprocket, said offset being in a direction towards the vertical wall surface whereby the direction of travel of each flight subsequent to passing the upper edge of the wall surface is upward and divergent to the plane of said wall surface.

2. The apparatus of claim 1 wherein the axis of rotation of said drive sprocket is laterally offset with respect to the axis of rotation of said idling sprocket.

3. The apparatus of claim 1 wherein the diameter of said drive sprocket is greater than the diameter of said idling sprocket.

References Cited

UNITED STATES PATENTS

| 1,495,450 | 5/1924 | Smith | 198—229 X |
| 3,303,920 | 2/1967 | Clyne | 198—154 |

FOREIGN PATENTS

| 533,351 | 2/1941 | Great Britain. |

EDWARD A. SROKA, Primary Examiner

U.S. Cl. X.R.

198—229